United States Patent Office 3,336,429
Patented Aug. 15, 1967

3,336,429
METHOD OF FORMING SHAPED ARTICLES
OF AMYLOSE
Frank E. Carevic, West Chester, Pa., assignor to FMC Corporation, Philadelphia, Pa., a corporation of Delaware
No Drawing. Filed July 10, 1964, Ser. No. 381,902
4 Claims. (Cl. 264—186)

This invention relates to a method of forming shaped articles of amylose.

U.S. Patent No. 3,030,667 and British Patent No. 847,431 disclose methods of spinning amylose film wherein a caustic solution of amylose is shaped and passed into a mixture of sulfuric acid and an inorganic sulfate. The British patentee prefers potassium hydroxide as the caustic dissolving medium.

It has been found that the manufacture of shaped articles in a method as described above using either potassium hydroxide alone or sodium hydroxide alone is not an economical or feasible process. The utilization of aqueous sodium hydroxide as the dissolution medium for amylose produces a structural transition during a necessary washing operation in which complete loss of strength of the article being manufactured occurs. On the other hand, the use of aqueous potassium hydroxide alone eliminates this loss of strength but produces a solution which gels too fast for a feasible commercial process and produces films having an undesirable haze.

It is an object of this invention to provide an economical and feasible process for producing shaped structures of amylose.

It is a further object of this invention to provide a commercially feasible method for the production of clear, thin elongated amylose structures such as films, tubes, bands and filaments.

These and other objects are accomplished in a method of forming shaped articles from amylose wherein an aqueous caustic solution of amylose is extruded in the form of a shaped article into an aqueous acid bath containing from about 20 to 40% by weight of an inorganic sulfate salt and from about 5 to 20% by weight of sulfuric acid, the improvement which comprises dissolving from about 12 to 25%, based on the weight of the amylose, of starch containing a major proportion of amylose in an aqueous caustic consisting essentially of from 4 to 10% by weight of potassium hydroxide and from about 0.1 to about 1.6% by weight of sodium hydroxide.

Amylose is a fraction of starch which is generally present therein in amounts of less than 50% by weight. Separation processes yield commercially available starches having high amylose contents. The amylose material for this invention has an amylose content of at least 50 wt. percent and preferably higher.

Inorganic sulfate salts include, for example, ammonium sulfate, sodium sulfate, potassium sulfate, magnesium sulfate and mixtures of these. Ammonium sulfate in an amount ranging from 25 to 35% is preferred on the basis of performance.

In general, the amount of sulfuric acid necessary for this invention ranges from 5 to 20% and preferably from about 8 to 12% by weight. Sulfuric acid is necessary to decrease the time of coagulation of the extruded amylose solution for a feasible process.

The use of potassium hydroxide in an amount ranging from about 4 to about 10% in an aqueous medium as a solvent for the amylose material is essential in the process in order to maintain the gel structure of the manufactured article during the later washing steps of the process. The preferred amount of potassium hydroxide in the preferred form of the invention ranges from about 5 to 8% based on the weight of the aqueous dissolution medium.

The use of a small amount of sodium hydroxide in the solvent medium has been found essential to prevent premature gelation of the amylose solution and to provide clear products. The greater solvent power of sodium hydroxide toward amylose permits a reduction in the amount of potassium hydroxide necessary in the solvent medium. The preferred amount of sodium hydroxide for this invention ranges from about 0.2 to 1.0% based on the weight of the aqueous dissolution medium.

Amylose films produced in accordance with this invention are preferably plasticized with conventional cellulose film plasticizing agents such as glycerine, ethylene glycol and other polyhydric alcohols.

Extrusion of films, which are required to be clear products, must take place without jet stretch. That is, clear films are produced only when substantially no stretch occurs between the extrusion nozzle and the first draw rolls after the film is coagulated.

Drying of the films, tubes and fibers may be hastened if desired by passing the film through a chemical dehydration bath prior to the physical drying procedure.

Evaporative drying of the films should be practiced at temperatures below 95° C. and preferably 75° C. to avoid splitting or cracking of the film due to excessive and rapid shrinking.

The following examples are set forth to demonstrate this invention.

*Example I*

A solution was prepared comprising 20% by weight of a starch containing 80 wt. percent amylose, 6% by weight of sodium hydroxide and 74% by weight of water. The solution was stirred, filtered and deaerated under static vacuum.

A small quantity of the solution was poured onto a very smooth, flat glass plate and spread to a thickness of 20 mils. The plate containing the viscous solution was then immersed in a coagulating solution comprising 20 wt. percent ammonium sulfate, 18 wt. percent sodium sulfate, 1 wt. percent sulfuric acid and 61 wt. percent water. On coagulation the film was stripped from the glass plate and washed in running water. When washed the film underwent a structural transition in which it lost its gel structure. If left undisturbed for about one minute, the viscous liquid reverted to a translucent gel with a slight bluish cast.

*Example II*

A solution was prepared comprising 23% by weight of a starch containing 80 wt. percent amylose, 6% by weight of lithium hydroxide and 71% by weight of water. The solution was stirred, filtered and deaerated as in Example I. The solution was spread on a plate as described for Example I and coagulated in a bath comprising 30% by weight of ammonium sulfate, 5% by weight of sulfuric acid and 65% by weight of water. The coagulated films were transferred to a water wash bath and thereupon lost their structure. Unlike the films cast from a sodium hydroxide solution the viscous liquids did not revert to a gel state on standing.

This last occurrence lent weight to the theory that the structural transition noted was due to a severe hydration of the gel film aided by entrapped alkali metal ions. The greater hydration of the lithium ions entrapped in the gel film caused a more severe structural transition than that caused by the sodium ions. On the other hand, the lower hydration of the potassium ions would lessen or perhaps eliminate the transition.

Example III

A solution was prepared comprising 23% by weight of a starch containing 80 wt. percent amylose, 8.4% by weight of potassium hydroxide and 68.6% water. The solution was stirred, filtered and deaerated as in Example I. The solution was spread on a glass plate and coagulated as in Example II. The gel film was washed in running water with no apparent structural transition or weakening of the gel. The finished film, however, was found to have an objectionable haze and amylose solutions dissolved in aqueous potassium hydroxide either become degraded or form a viscous gel on standing depending on the KOH concentration.

Example IV

An amylose solution was prepared by first slowly adding 325 g. of potassium hydroxide and 15 g. of sodium hydroxide to 3810 g. of water with stirring. After the solution had cooled to room temperature, 1062 g. of a refined starch containing 80 wt. percent amylose was added while the solution was vigorously stirred for about one hour to a smooth solution.

The viscous solution was then filtered through spun glass and cloth filters with the aid of a pressure filtering device. The filtered solution which was full of entrapped air bubbles was deaerated under a static vacuum.

The filtered and deaerated amylose solution was charged to a 2-liter stainless steel reservoir which was connected to a variable speed viscose pump. The pump forced the solution through a flexible pressure hose into a four inch film extrusion nozzle, which extruded the solution in a flat sheet of 4 mils just below the surface of a coagulating both contained in a 6 inch wide stainless steel tank. The coagulating bath comprised 30% by weight of ammonium sulfate, 10% by weight of sulfuric acid and 60% by weight of water.

The film was passed under several guide rolls in the coagulating tank and over a motor driven variable speed roll as it emerged from the tank. This driven roll was rotated at speed sufficient to draw the coagulated film from the tank without causing any appreciable stretch between the extrusion nozzle and the driven roll. The film proceeded from the driven roll into a circulating water wash bath and then through an aqueous 10% glycerol plasticizing bath.

From the plasticizing bath the film was passed repeatedly around a dryer drum kept at 70° C. until drying was complete.

A clear, strong, flexible film was produced in accordance with the foregoing procedure.

To demonstrate the critically of the mixture of hydroxides for this invention the following table is set forth.

TABLE

| Solution No. | Solution Composition,[1] Wt. percent | | | Remarks |
|---|---|---|---|---|
| | Amylose | KOH | NaOH | |
| 1 | 20 | 6.90 | 0 | Initially homogeneous solutions. A large number of gel particles were formed after 48 hours. |
| 2 | 20 | 7.25 | 0 | |
| 3 | 20 | 7.59 | 0 | |
| 4 | 20 | 7.94 | 0 | |
| 5 | 20 | 8.28 | 0 | |
| 6 | 20 | 8.63 | 0 | |
| 7 | 20 | 8.97 | 0 | Large decrease in solution viscosity after 48 hours, indicating degradation. |
| 8 | 20 | 9.32 | 0 | |
| 9 | 20 | 9.66 | 0 | |
| 10 | 20 | 10.00 | 0 | |
| 11 | 20 | 10.35 | 0 | |
| 12 | 17 | 3.00 | 2.10 | Non-gelling solution. Coagulated film was very weak. |
| 13 | 17 | 5.00 | 0 | Solution set to a rigid gel in 24 hours. |
| 14 | 17 | 5.00 | 0.50 | Non-gelling solution. Coagulated film was strong, but dried film was hazy. |
| 15 | 17 | 5.00 | 1.00 | Non-gelling solution. Coagulated film was strong and dried clear. |
| 16 | 17 | 6.00 | 0.30 | Non-gelling solution. Coagulated film was strong but dried film was hazy. |
| 17 | 17 | 6.50 | 0.30 | Non-gelling solution. Coagulated film was strong and dried clear. |
| 18 | 23 | 7.95 | 0.57 | Do. |
| 19 | 23 | 8.35 | 0.25 | Do. |

[1] Aqueous Solutions: Coagulating bath composition: 30 wt. percent $(NH_4)_2SO_4$, 10 wt. percent $H_2SO_4$; 60 wt. percent $H_2O$. Temp. 25° C.

Various changes and modifications may be made practicing the invention without departing from the spirit and scope thereof and, therefore, the invention is not to be limited except as defined in the appended claims.

I claim:

1. A method of forming shaped articles from amylose wherein an aqueous caustic solution of amylose is extruded in the form of a shaped article into an aqueous acid bath containing from about 20 to 40% by weight of an inorganic sulfate salt and from about 5 to 20% by weight of sulfuric acid, the improvement which comprises dissolving from about 12 to 25%, based on the weight of the amylose, of a starch containing a major proportion of amylose in an aqueous caustic solution consisting essentially of from 4 to 10% by weight of potassium hydroxide and from about 0.1 to about 1.6% by weight of sodium hydroxide.

2. In a method of forming shaped articles from amylose wherein an aqueous caustic solution of amylose is extruded in the form of a shaped article into an aqueous acid bath containing from about 25 to 35% ammonium sulfate and from about 8 to 12% by weight of sulfuric acid, the improvement which comprises dissolving about 12 to 25% based on the weight of the amylose of a starch containing a major proportion of amylose in an aqueous caustic consisting essentially of from 4 to 10% by weight of potassium hydroxide and from about 0.1 to about 1.6% by weight of sodium hydroxide.

3. The method of claim 2 wherein the aqueous caustic solution consists essentially of from 5 to 8% by weight of potassium hydroxide and from about 0.2 to 1.0% by weight of sodium hydroxide.

4. The method of claim 2 wherein the shaped article is a film.

References Cited

UNITED STATES PATENTS

| 3,030,667 | 4/1962 | Kunz | 264—186 |
| 3,116,351 | 12/1963 | Wohlrabe et al. | 264—186 |

FOREIGN PATENTS

| 847,431 | 4/1960 | Great Britain. |

ROBERT F. WHITE, *Primary Examiner.*

G. AUVILLE, *Assistant Examiner.*